United States Patent [19]
Warner, Jr.

[11] 3,863,007
[45] Jan. 28, 1975

[54] SUNSCREENING METHOD CONTAINING 4-DI(LOWER)ALKYLAMINOBENZAMIDES

[76] Inventor: Paul L. Warner, Jr., 5200 Bank St., Clarence, N.Y. 14031

[22] Filed: Mar. 28, 1974

[21] Appl. No.: 455,755

Related U.S. Application Data

[63] Continuation-in-part of Ser. No. 145,941, May 21, 1971, abandoned.

[52] U.S. Cl. ........... 424/60, 106/186, 260/45.9, 426/321, 424/170
[51] Int. Cl. ................. A61k 9/06, A61l 23/00
[58] Field of Search ....................... 424/60

[56] References Cited
UNITED STATES PATENTS
2,561,468  7/1951  Guest ........................ 424/60 X FOREIGN PATENTS OR APPLICATIONS
799,467  8/1958  Great Britain ............... 424/60
867,135  2/1953  Germany ..................... 424/60

OTHER PUBLICATIONS
Meisenheimer et al., Justus Liebig's Annalender Chemie, 1921, Vol. 423, pp. 75, 81, 82 & 90–93

Hall, Journal of Chem. Soc., 1948, pp. 1603–1605

Ring, Journal of Org. Chemistry, 1962, Vol. 27, pp. 2428–2432.

Lockemann et al., 1947, Chemische Berichte, pp. 310–315.

Degutis et al., Chemical Abs., 1962, Vol. 56, p. 3354.

Garmaise et al., Chem. Abs., 1969, Vol. 70, p. 47432.

Thewalt et al., Chem. Abs., 1969, Vol. 71, p. 292.

Primary Examiner—Albert T. Meyers
Assistant Examiner—Dale R. Ore
Attorney, Agent, or Firm—James Magee, Jr.

[57] ABSTRACT

4-Di(lower)alkylaminobenzamides are compounds possessing light absorbing properties, said compounds being useful as sunscreening agents and for protecting organic materials from degradation by ultra-violet radiation.

4 Claims, No Drawings

A SUNSCREENING METHOD CONTAINING 4-DI(LOWER)ALKYLAMINOBENZAMIDES

This application is a continuation-in-part of application Ser. No. 145,941 filed May 21, 1971, now abandoned.

BACKGROUND OF THE INVENTION

1. Field of the Invention

This invention is in the field of sunscreening agents for both medicinal and commercial purposes.

2. Description of the Prior Art

None of the compounds of this invention are reported as possessing sunscreen properties. Some of the compounds of this invention, however, are known in the literature.

A. 4-Dimethylamino-N-methylbenzamide is reported by Garmaise, Chambers and McCrae in *J. Med. Chem.*, 11, 1205 (1968) as an intermediate chemical in the production of thiazolium salts.

B. 4-Dimethylaminobenzanilide is reported by Lockmann and Newmann in *Chemische Berichte*, 80, 310 (1947) [Chem. Abst. 42, 3745 (1948)].

C. 4-Dimethylamino-N-methylbanzanilide is reported by Ring, Sharefkin and Davidson in *J. Org. Chem.*, 27, 2428 (1962).

D. 4-Dimethylamino-2'-methylbenzanilide is reported by D. Hall in *J. Chem. Soc.*, 1948, 1603.

E. 4-Diethylaminobenzanilide is reported by Meisenheimer, von Budkewicz and Kananow in *Annalin*, 423, 75 (1921).

F. 4-N,N-bis(2-hydroxyethyl)aminobenzamide is reported by Degutis and Sukelien, *Zh. Obshch. Khim.*, 31, 3326 (1961) [*Chem. Abstr.*, 57, 3354 (1962)].

SUMMARY OF THE INVENTION

The compounds of the instant invention having the formula

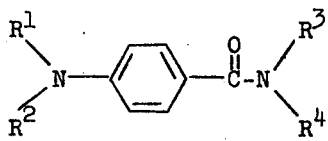

in which $R^1$ and $R^2$ are alike or different and each is (lower)alkyl or hydroxy(lower)alkyl; $R^3$ is hydrogen or (lower)alkyl; $R^4$ is H, (lower)alkyl or a radical of the formula

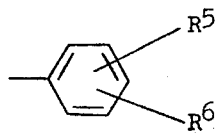

in which $R^5$ and $R^6$ are alike or different and each is H, (lower)alkyl, (lower)alkoxy, chloro, fluoro or trifluoromethyl.

This invention relates to useful and novel compositions particularly effective in filtering ultra-violet irradiation to remove the rays that are harmful to human skin or organic materials thereby protecting against the burning and degrading effects of sunlight.

Various organic compounds exhibit the power to absorb electromagnetic radiations within the band of 2900 to 4000 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like. Sunscreen agents can also be dissolved or suspended in a suitable solvent or vehicle and applied to a surface by painting, spraying or spreading.

Numerous organic compounds have been suggested as absorbents for the range of radiations described above, which range of radiation considered by many to be the most damaging. Uses of these absorbents include incorporation in plastic sheet materials and the stabilization in general of transparent plastic bodies. By far, the greatest concern with respect to such radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency problem may not be paramount.

In the area of sunscreen agents for protecting the skin, the most detrimental wavelengths are those from about 2900 to 3100 A. In this range severe burning results. From about 3200 to 3500 A. the sun's radiations generally produce a tanning of the skin. For effective sunscreening a compound or composition should, at least, remove substantially all of the burning rays, and in many instances a good portion of the tanning rays. For many applications, the compounds should be light-fast for hundreds of hours but in other applications, this is not important. Thus, for sunscreening on the skin, only a few hours light-fastness is necessary, but here it is more desirable to have a compound which has more affinity for the skin to assure adequate protection.

It is therefore an object of the present invention to provide new and useful light absorbing compositions.

It is still another object of this invention to provide methods for protecting light sensitive subjects against erythema and other adverse effects of exposure to ultra-violet radiation.

Still another object of this invention is to provide new and useful methods for protecting organic materials against the degradative effects of ultra-violet radiation by applying compositions comprising the herein disclosed compounds to the surface of a subject in such a manner that it acts as a filter or barrier to the radiation.

It is still a further object of this invention to provide compositions which are outstanding sunscreen agents and for methods for protecting human skin against the burning and degradative effects of sunlight.

It has been found that compounds having the general formula

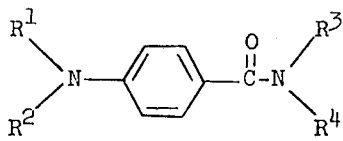

in which $R^1$ and $R^2$ are alike or different and each is (lower)alkyl or hydroxy(lower)alkyl; $R^3$ is hydrogen or (lower)alkyl; $R^4$ is H, (lower)alkyl or a radical of the formula

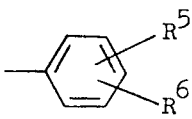

wherein $R^5$ and $R^6$ are alike or different and each is H, (lower)alkyl, (lower)alkoxy, chloro, fluoro or trifluoromethyl; are effective light screening agents. Compounds of formula I are particularly effective in blocking most the ultra-violet rays responsible for causing sunburn while still allowing the desired tanning rays to reach the skin. These compounds are further advantageous over the other sunscreen agents, particularly p-aminobenzoic acid, in that they are much less prone to undergo photolytic oxidation to produce colored staining dyes as most primary amines will do. The compounds are water and/or organic solvent soluble and are readily formulatable into "pharmaceutically elegant" products having desirable properties for topical application on the skin.

A preferred group of compounds within the above formula are those on which $R^3$ is hydrogen and $R^4$ is a radical of the formula

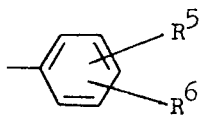

wherein $R^5$ and $R^6$ are described above.

These particular compounds are characterized by substantial absorption coefficients. A high absorption coefficient is indicative of a compound which can absorb substantial amounts of radiation at relatively low molecular concentrations.

Similarly, compounds in which $R^1$ and $R^2$ are (lower)alkyl, e.g., methyl, $R^3$ is hydrogen, and $R^4$ is the substituted phenyl radical in which $R^5$ and $R^6$ are, as defined above, among a preferred group of compounds because of the improved absorption characteristics possessed by these compounds.

Accordingly, among the more effective radiation absorbing compounds are those having the structure

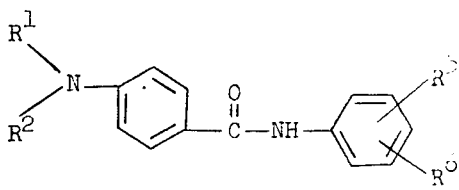

wherein $R^5$ and $R^6$ are individually selected from the group consisting of hydrogen, (lower)alkyl, (lower)alkoxy, fluoro, chloro, and trifluoromethyl and $R^1$ and $R^2$ are individually selected from the group consisting of (lower)alkyl and hydroxy (lower)alkyl, e.g., methyl, ethyl, and hydroxyethyl.

The compounds of this invention are formulated for use as a sunscreen by admixture with some suitable vehicle which can facilitate application of the sunscreen as a barrier or filter to be applied to or admixed with the substrate. In general, the sunscreens are used in a protective amount, i.e., an amount which is sufficient to provide substantial protection of the substrate by blocking or filtering ultra-violet radiation. The barrier protects against the undesirable effects of exposure to ultra-violet radiation such as erythema in the case of mammalian skin and photo-catalyzed or induced decompositions in the case of other materials. The compounds of this invention can be employed in amounts ranging from about 1 to about 10% by weight, either on the surface of the substrate to be protected or in admixture therewith. If applied to skin as a sunscreening agent, the concentration of the compound in the formulation should be within the range set forth above, and more preferably from about 2 to about 6% by weight based on the weight of the composition applied to the skin.

A preferred embodiment of the present invention is the process of protecting light-sensitive materials from adverse effects of ultra-violet radiation by applying or incorporating a radiation-absorbing compound in a protective amount upon or into a light-sensitive material to prevent radiation damage. The term protective amount refers to an amount which is sufficient to screen out substantially all of the ultra-violet radiation to which it is exposed.

More specifically, the radiation-absorbing compound is utilized by applying or incorporating it upon or into the substrate material to prevent radiation damage in a concentration range of about 1% to about 10%, by weight of either the substrate or a barrier formulation, depending on the manner of use.

Depending on the intrinsic capacity of the radiation-absorbing compound, the amount of the compound needed to provide a protective barrier will vary. Accordingly, the amount of compound employed in a particular formulation can be adjusted to provide the so-called protective amount. In the case of the benzanilide compounds, such as those described in Table II, supra, compositions containing from 2 to 6% by weight of the compound can provide substantial protection when spread upon human skin.

In a particular aspect of the invention, the herein disclosed radiation-absorbing compounds are used to apply to the human skin a barrier or filter layer to prevent sunburn or skin damage. An effective concentration range for the active ingredient in a suitable cosmetic vehicle is from about 1% to about 10% by weight.

For the purpose of this disclosure, the term(lower)alkyl shall mean straight or branched chain hydrocarbon radicals containing one to six carbon atoms, e.g., methyl, ethyl, n-propyl, isopropyl, or the like. The term hydroxy(lower)alkyl shall mean straight or branched chain hydrocarbon radicals containing one to six carbon atoms, said radical containing one hydroxyl group, e.g., hydroxyethyl, hydroxypropyl, hydroxyisopropyl, or the like.

The compounds of formula I employed as sunscreens in the instant invention are of low toxicity when administered orally and are essentially inert upon topical administration.

All of the compounds of the examples illustrated herein exhibited oral $LD_{50}$'s (lethal dose in 50% of the mice so treated) that were greater than 2.5 gram/kg. The preferred compound of the present invention, 4-N,N-bis(2-hydroxyethyl)-aminobenzamide, had an $LD_{50}$ greater than 2.5 gram/kg. The compounds were determined to be non-irritating to the skin of the Guinea pig in the standard Guinea pig patch test.

Experimental

Ultra-violet spectra were obtained on a Beckman DB-G. Melting points were taken on a Mal-Temp melting point apparatus and are corrected. Elemental analysis were performed by Galbraith Laboratories, Inc., Knoxville, Tenn.

The ultra-violet absorption maxima of the 4-dialkylaminobenzamides are given in Table I.

Except for 4-dimethylaminobenzamide (1, Table III), which was prepared by reacting 4-dimethylaminobenzoyl chloride[1] with concentrated ammonium hydroxide, the 4-dimethylaminobenzamides reported were synthesized by stirring 0.05 mole of the acid chloride with an equimolar solution of the appropriate amine in 25 ml. of dry pyridine. After heating briefly to boiling, the crude product was isolated by precipitation from water.

[1]. A. I. Kiprianov and V. A. Shrubovich, *J. Chem. Soc. (U.S.S.R.)*, 26, 3215 (1956).

4-Diethylaminobenzoic acid was prepared by KOH fusion of 4-diethylaminobenzaldehyde (Aldrich) according to the method of Decombe[2] for the synthesis of 3-dimethylaminobenzoic acid. 4-Diethylaminobenzoic acid was obtained in 64.3% yield after crystallization from aqueous ethanol, m.p. 199°–200°.[3]

[2]. J. Decombe, *Bull. soc. chim. France*, (1951), 416.

[3]. E. M. Hancock, E. M. Hardy, D. Heyl, M. E. Wright, and A. C. Cope, *J. Am. Chem.*, 66, 1748 (1944) report m.p. 191.5–192.5.

4-Diethylaminobenzoyl chloride was formed from the dried sodium salt of 4-diethylaminobenzoic acid according to the procedure for the preparation of 4-dimethylaminobenzoyl chloride.[1] The acid chloride was reacted in situ with excess aniline to prepare 4-diethylaminobenzanilide (13, Table II).

TABLE I

Ultra-Violet Absorption Maxima of Various 4-Dialkylaminobenzamides in Absolute Ethanol A. 4-Dimethylaminobenzamides

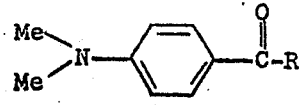

| Compound No. | R | Max (nm.) | Am |
|---|---|---|---|
| 1 | -NH₂ | 304 | 23,900 |
| 2 | -NHMe | 300 | 24,100 |
| 3 | -NH-⌬ | 315 | 33,100 |
| 4 | -NMe-⌬ | 308 | 20,600 |
| 5 | -NH-⌬(Me) | 310 | 31,000 |
| 6 | -NH-⌬(Me) | 314 | 34,800 |
| 7 | NH-⌬-Me | 315 | 35,500 |
| 8 | NH-⌬-Cl | 318 | 39,300 |
| 9 | NH-⌬(OMe) | 318 | 36,500 |
| 10 | NH-⌬-OMe | 314 | 35,000 |

TABLE I—Continued

| Compound No. | R | Max (nm.) | $A_m$ |
|---|---|---|---|
| 11 | NH—⟨phenyl⟩—Me, Me (2,4-dimethyl) | 315 | 33,900 |
| 12 | NH—⟨phenyl⟩—$CF_3$ | 316 | 33,300 |

Table II

| Compound No. | R | Max (nm.) | $A_m$ |
|---|---|---|---|
| 13 | $Et_2N$—⟨phenyl⟩—C(O)—NH—⟨phenyl⟩ | 318 | 37,270 |
| 14 | (HO-$CH_2$-$CH_2$)$_2$N—⟨phenyl⟩—C(O)—$NH_2$ | 309 | 24,200 |
| 15 | (HO-$CH_2$-$CH_2$)$_2$N—⟨phenyl⟩—C(O)—NHMe | 302 | 24,200 |

TABLE III

4-Dimethylaminobenzamides

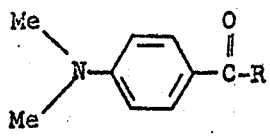

$Me_2N$—⟨phenyl⟩—C(O)—R

| No. | R | Recryst'n Solvent | m.p., °C. | % Yield | Formula | Analysis Calc'd. | Found |
|---|---|---|---|---|---|---|---|
| 1 | $-NH_2$ | MeOH, $H_2O$ | 196–197.5 | 41.8 | $C_9H_{12}N_2O$ | C=65.83<br>H= 7.37<br>N=17.06<br>O= 9.74 | 65.79<br>7.59<br>16.94 |
| 6 | -NH-⟨phenyl⟩-Me (meta) | EtOH, $H_2O$ | 130–131 | 74.0 | $C_{16}H_{18}N_2O$ | C=75.56<br>H= 7.13<br>N=11.01<br>O= 6.29 | 76.60<br>7.26<br>11.20 |
| 7 | -NH-⟨phenyl⟩-Me (para) | EtOH, $H_2O$ | 172–173 | 84.3 | $C_{16}H_{18}N_2O$ | C=75.56<br>H= 7.13<br>N=11.01<br>O= 6.29 | |

Table III (Continued)

| No. | R | Recryst'n Solvent | m.p., °C. | % Yield | Formula | Analysis Calc'd. | Found |
|---|---|---|---|---|---|---|---|
| 9 | -NH-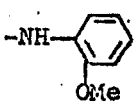-OMe (ortho) | EtOH, H₂O | 109-110 | 80.0 | $C_{16}H_{18}N_2O_2$ | C=71.09<br>H= 6.71<br>N=10.36<br>O=11.84 | 70.90<br>6.51<br>10.36 |
| 10 | -NH-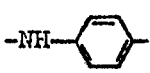-OMe | EtOH | 183-184 | 73.7 | $C_{16}H_{18}N_2O_2$ | C=71.09<br>H= 6.71<br>N=10.36<br>O=11.84 | 70.91<br>6.70<br>10.36 |
| 11 | -NH-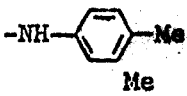-Me,Me | Toluene | 148-149 | 87.3 | $C_{17}H_{20}N_2O$ | C=76.09<br>H= 7.51<br>N=10.44<br>O= 5.96 | 75.91<br>7.40<br>10.23 |
| 12 | -NH-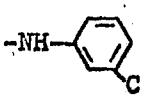-CF₃ | Benzene-Hexane | 130-131.5 | 81.8 | $C_{16}H_{15}F_3ON_2$ | C=62.33<br>H= 4.90<br>N= 9.08<br>O= 5.19<br>F=18.49 | 62.16<br>5.04<br>9.11 |

The N-methylamide of 4-N,N-bis-(2-hydroxyethyl)aminobenzoic (15, Table II) was prepared by the method of J. Degutis and D. Sukeliene, *J. Chem. Soc., U.S.S.R.*, 31, 3103 (1961) from the N-methylamide of 4-aminobenzoic acid (H. Wender, *J. Am. Chem. Soc.*, 60, 1081 (1938) to provide, following crystallization from isopropanol-ethyl acetate-heptane mixture, 65.6% of product, m.p. 142°-142.5°.

Calc'd. for $C_{12}H_{18}N_2O_3$: C, 60.49; H, 7.61; N, 11.78; O, 20.14.

Found: C, 60.43; H, 7.68; N, 11.65.

EXAMPLES OF THE EMBODIMENTS

Example 1

| | |
|---|---|
| 4-N,N-Bis(2-hydroxyethyl)aminobenzoic Acid, N-Methylamide (C) | 5.0 gm. |
| Propylene Glycol<br>Ethanol (95%) āā qs. ad. | |

Dissolve compound C in 40 ml. of 95% ethanol. Add 40 ml. of propylene glycol and qs. to 100 ml. with a 1:1 mixture of propylene glycolethanol (95%). Apply to skin to prevent sunburn.

Example 2

| | |
|---|---|
| 4-N,N-Bis(2-hydroxyethyl)aminobenzamide (A) | 4.0 gm. |
| Vanishing Cream base qs. ad. | 100 gm. |

Finely pulverize compound A in mortar with pestle, Add 10 gm. of vanishing cream to make a paste. Qs. ad. to 100 gm. Apply to skin to prevent sunburn.

Example 3

| | |
|---|---|
| 4-N,N-Bis(2-hydroxyethyl)aminobenzamide (A) | 4.0 gm. |
| Emollient Lotion qs. ad. | 100 ml. |

Finely pulverize compound A in mortar with pestle. Add enough emollient lotion to make a fine paste, then qs. ad. to 100 ml. Apply to skin to prevent sunburn.

Example 4

| | |
|---|---|
| 4-N,N-Bis(2-hydroxyethyl)aminobenzamide (A) | 5.0 gm. |
| Anhydrous wool fat | 5.0 gm. |
| Light mineral oil qs. ad. | 100 ml. |

Finely pulverize compound A in mortar with pestle. Add wool fat and 5 ml. of mineral oil. Make a paste. Qs. ad. 100 ml. with mineral oil. Apply to skin to prevent sunburn.

Example 5

| | |
|---|---|
| 4-Dimethylaminobenzanilide (B) | 5.0 gm. |
| Cocoa Butter qs. ad. | 100 gm. |

Finely pulverize compound B in mortar with pestle. Add 10 gm. of cocoa butter and make paste. Qs. ad. 100 gm. with cocoa butter. Apply to skin to prevent sunburn.

For the purpose of this disclosure, the term "cosmetic vehicle" shall be meant to include those vehicles commonly employed in the art as diluents or bases of sunscreening compositions. These vehicles include, amongst others, vegetable oils, mineral oils, petrolatums, vegetable or mineral waxes, oil in water emulsions, water in oil emulsions, alcohols, polyhydroxyalcohols, and the like, or combinations thereof, all of which are commonly found in the cosmetic pharmaceutical and sunscreen art.

Example 6

The compound 4-dimethylamino-N,N-dimethylbenzamide was prepared by the procedure of G. P. Schiemenz, *Spectrochim, Acta*, Part A, 24, 1735 (1968). The literature reports absorption at $\lambda_{max}^{H_2O} = 279.5$ n.m. A coefficient of absorption of $A_m = 17,065$ was found at $\lambda_{max}^{EtOH} = 287$. This indicates the di-alkylation reduces absorption efficiency.

In view of the above, it appears that substitution of an alkyl group for a hydrogen on the amide nitrogen reduces absorptivity and that the benzamide compound (No. 1 in Table I) has less absorptivity than the benzanilides. Mono-alkylation also reduces absorption. However, substitution of an aryl group on the amide nitrogen increases absorption.

I claim:

1. A method for protecting human skin from ultraviolet radiation which comprises applying to the skin to be protected an effective ultraviolet radiation-absorbing amount of a radiation-absorbing composition consisting essentially of an effective amount of dialkylaminobenzanilide of the structure

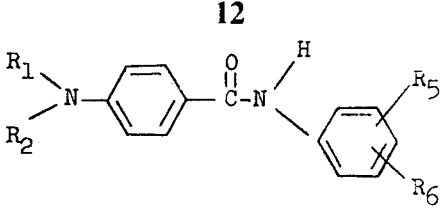

wherein $R_1$ and $R_2$ and both methyl, ethyl, or hydroxyethyl, and $R_5$ and $R_6$ are individually selected from the group consisting of hydrogen, lower alkyl, hydroxy lower alkyl, fluoro, chloro, and trifluoromethyl and an inert cosmetic vehicle for said dialkylaminobenzanilide.

2. The method of claim 1, wherein $R_1$ and $R_2$ are methyl.

3. The method of claim 1, wherein $R_1$ and $R_2$ are ethyl.

4. The method of claim 1, wherein $R_1$ and $R_2$ are hydroxyethyl.

* * * * *